United States Patent
Ki

(10) Patent No.: US 7,884,402 B2
(45) Date of Patent: Feb. 8, 2011

(54) IMAGE SENSOR

(75) Inventor: An Do Ki, Cheongju-si (KR)

(73) Assignee: Dongbu Hitek Co., Ltd., Seoul (KR)

( * ) Notice: Subject to any disclaimer, the term of this patent is extended or adjusted under 35 U.S.C. 154(b) by 152 days.

(21) Appl. No.: 12/239,924

(22) Filed: Sep. 29, 2008

(65) Prior Publication Data
US 2009/0114961 A1 May 7, 2009

(30) Foreign Application Priority Data
Nov. 6, 2007 (KR) .................. 10-2007-0112547

(51) Int. Cl.
- H01L 31/062 (2006.01)
- H01L 31/113 (2006.01)
- H04N 3/14 (2006.01)
- H04N 5/335 (2006.01)
- H04N 9/04 (2006.01)
- H04N 9/083 (2006.01)

(52) U.S. Cl. .................. 257/292; 257/E27.132; 257/E27.133; 348/272

(58) Field of Classification Search .................. 348/272; 257/292, 27.132, E27.133 E
See application file for complete search history.

(56) References Cited

U.S. PATENT DOCUMENTS
2006/0028568 A1* 2/2006 Takeda .................. 348/294

FOREIGN PATENT DOCUMENTS
JP 2002320119 A * 10/2002
KR 10-2006-0130547 12/2006

* cited by examiner

Primary Examiner—David S Blum
(74) Attorney, Agent, or Firm—Saliwanchik, Lloyd & Saliwanchik

(57) ABSTRACT

Provided is an image sensor. According to embodiments, the subject image sensor can include a photodiode for converting incident light into electrical signals, a reset transistor for resetting a voltage value of a unit pixel, a drive transistor for providing an output voltage, a select transistor for selecting the unit pixel, a storage capacitor for storing electrons leaking from the photodiode, and a switching transistor for controlling the flow of charge to and from the storage capacitor. The switching transistor can be disposed connected to a node between the photodiode and the reset transistor, and the storage capacitor can be disposed at a side of the switching transistor.

5 Claims, 1 Drawing Sheet

IMAGE SENSOR

CROSS-REFERENCE TO RELATED APPLICATION

The present application claims the benefit under 35 U.S.C. §119 of Korean Patent Application No. 10-2007-0112547, filed Nov. 6, 2007, which is hereby incorporated by reference in its entirety.

BACKGROUND

In general, an image sensor is a device that converts optical images into electrical signals.

FIG. 1 is a circuit diagram illustrating a photodiode unit pixel of an image sensor according to a related art.

According to the related art, when light is incident into a photodiode (PD) 110 in the state where transistors (TRs) of all pixels are turned off, signal electrons are generated and accumulated in an integration state in the photodiode 110.

At this point, a selective TR (Sx) 160 is turned on, so that a predetermined pixel 100 is selected. After that, a reset TR (Rx) 140 is turned on to reset noises of a floating diffusion (FD) 130 through a VDD terminal. At this point, the voltage of the FD 130 is output as a first output voltage V1 through a drive TR (Dx) 150.

Then, a transfer TR (Tx) 120 is turned on, and signal electrons in a fully integration state in the photodiode 110 are transferred to the FD 130. At this point, a second output voltage V2 is output.

A final output signal is output as a value of V1-V2.

According to the related art, since the capacity of the photodiode 110 is limited, when 100% light is incident, all signal electrons corresponding to the 100% light are not stored, e.g., the photodiode 110 is saturated by about 85% signal electrons and the other 15% signal electrons overflow into the FD 130. Thus, the signal electrons overflowing into the FD 130 are all disappeared during the reset operation.

Thus, there exists a need in the art for an improved image sensor capable of increasing the dynamic range of the image sensor.

BRIEF SUMMARY

Embodiments of the present invention provide an image sensor that can increase a saturation level thereof by combining a transistor with a capacitor without increasing the area of a photodiode. According to an embodiment, an image sensor can be provided that can increase a saturation level thereof up to a maximum of about 100% by storing and using the signal electrodes that overflow into a floating diffusion region, thereby increasing a dynamic range of the image sensor up to a maximum.

In one embodiment, an image sensor comprises: a photodiode; a reset transistor; a drive transistor; a selective transistor; a switching transistor between the photodiode and the reset transistor; and a storage capacitor on a side of the switching transistor.

The details of one or more embodiments are set forth in the accompanying drawings and the description below. Other features will be apparent from the description and drawings, and from the claims.

DETAILED DESCRIPTION

Hereinafter, an image sensor according to an embodiment will now be described in detail with reference to the accompanying drawing.

It is to be understood that the figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 1:
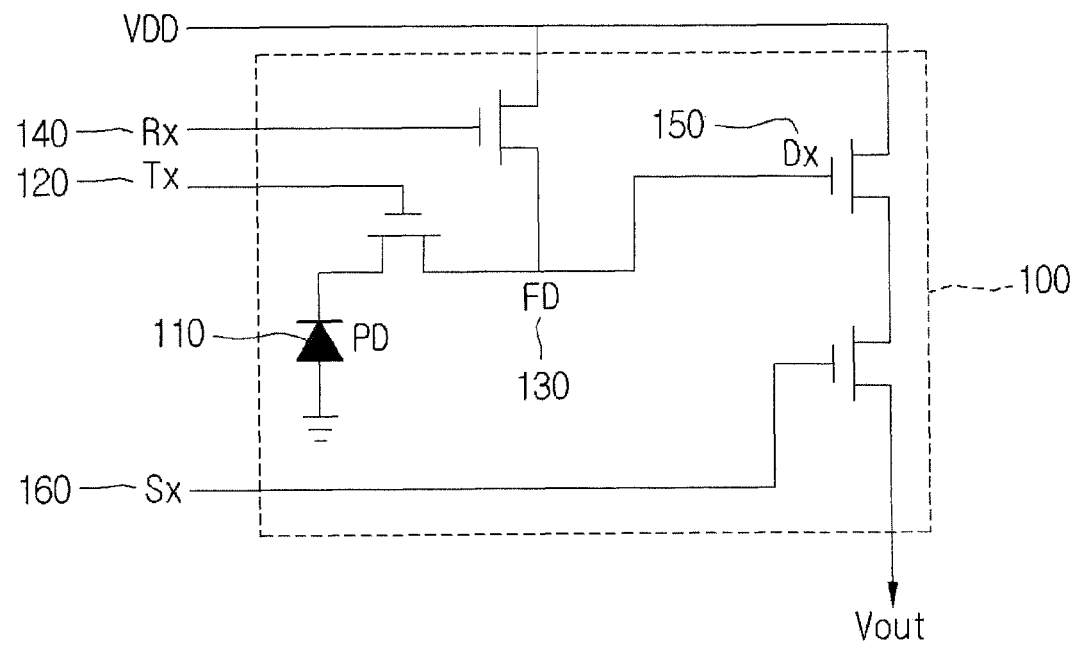
FIG. 1 is a circuit diagram illustrating a photodiode unit pixel of an image sensor according to a related art.
Figure 2:
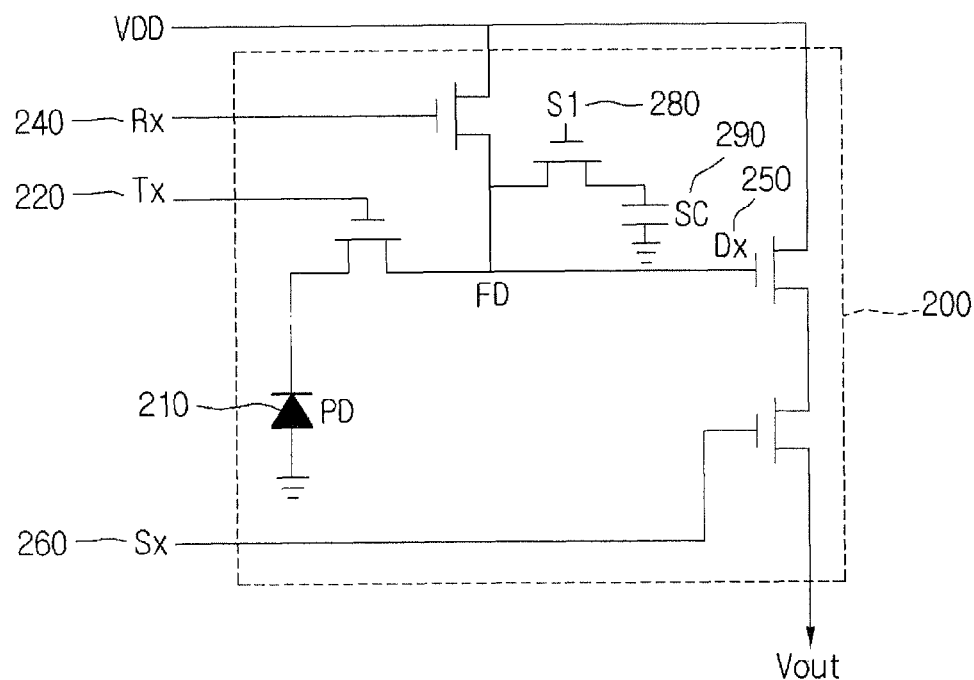
FIG. 2 is a circuit diagram illustrating a photodiode unit pixel of an image sensor according to an embodiment.

FIG. 2 is a circuit diagram illustrating a photodiode unit pixel 200 of an image sensor according to an embodiment.

According to embodiments, the subject image sensor can include a photodiode 210 for converting incident light into electrical signals, a reset transistor 240 for resetting a voltage value of a unit pixel, a drive transistor 250 for providing an output voltage, a select transistor 260 for selecting the unit pixel, a storage capacitor (SC) 290 for storing electrical signals leaking from the photodiode, and a switching transistor (S1) 280 for controlling the flow of charge to and from the storage capacitor (SC) 290. The switching transistor 280 can be disposed connected to a node between the photodiode 210 and the reset transistor 240, and the storage capacitor 290 can be disposed at a side of the switching transistor 280.

In this embodiment, a 4TR-type complementary metal oxide semiconductor image sensor (CIS) is provided. Accordingly, the transistor circuit further comprises a transfer transistor 220 and a floating diffusion region FD between the photodiode 210 and the reset transistor 240. Therefore, the switching transistor 280 can be disposed connected to a node between the floating diffusion region FD and the reset transistor 240.

According to an embodiment, the storage capacitor 290 stores electrons overflowing from the photodiode 210 into the floating diffusion region FD and then outputs the stored electrons together with electrons inflowing when the transfer transistor 220 is turned on as signal electrons.

For example, when the switching transistor 280 is turned on, electrons overflowing from the photodiode 210 into the floating diffusion region FD are transferred and stored in the storage capacitor 290, and then the switching transistor 280 can be turned off. Thereafter, when the transfer transistor 220 is turned on, and electrons flow into the floating diffusion region FD, the switching transistor 280 is turned on to output the electrons transferred from the photodiode 210 using the transfer transistor 220 together with the stored electrons in the storage capacitor 290 as signal electrons.

The image sensor according to embodiments can effectively store disappearing electrons and add the stored electrons to the signal electrons by providing the additional transistor and the storage capacitor (SC) for storing overflowed electrons.

For example, about 15% of charges from incident light to the photodiode 210 overflow from the photodiode 210 into the floating diffusion region FD and can be transferred to and stored in the storage capacitor 290 by turning the switching transistor 280 on and then off.

Thus, when the reset transistor 240 is turned on to reset the floating diffusion region FD, the electrons stored in the storage capacitor 290 do not disappear.

After that, when the transfer transistor 220 is turned on, and electrons are transferred to the floating diffusion region FD, the switching transistor 280 is turned on, and the electrons stored in the storage capacitor 290 are transferred to the floating diffusion region FD and are output together with the electrons transferred from the transfer transistor 220. Thus, a saturation level can be increased up to a maximum of 100% without disappearing electrons, thereby increasing a dynamic range of the image sensor.

The adding of the switching transistor 280 and the storage capacitor 290 to the pixel may reduce a fill factor, but a shared pixel structure can prevent excessive reduction of the fill factor.

Even when three additional transistors are provided in a pixel, the fill factor in a 1+1 shared structure is not affected. Thus, the switching transistor 280 and the storage capacitor 290 can be added without excess problems.

The image sensor according to an embodiment can increase the saturation level without increasing the physical area of the photodiode by connecting a switching transistor (S1) and a storage capacitor (SC) to a node between the floating diffusion terminal and the reset transistor, thereby effectively increasing the dynamic range.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image sensor comprising:
   a photodiode;
   a transfer transistor for transferring charges front the photodiode to a floating diffusion region;
   a drive transistor for outputting an electric signal depending on charges accumulated in the photodiode;
   a reset transistor for resetting a voltage value of a unit pixel before charge transference of the charges accumulated in the photodiode;
   a select transistor for selecting the unit pixel from a plurality of unit pixels;
   a switching transistor connected at a node between the photodiode and the reset transistor; and
   a storage capacitor in series with the switching transistor between a side of the switching transistor and a ground,
   wherein a drain of switching transistor is disposed between the floating diffusion and the reset transistor.

2. The image sensor according to claim 1, wherein the switching transistor is connected such that the storage capacitor stores electrons that overflow from the photodiode into the floating diffusion region when the switching transistor is turned on, and outputs the stored electrons to the floating diffusion region as signal electrons for combination with electrons inflowing into the floating diffusion region when the transfer transistor is turned on.

3. The image sensor according to claim 2, wherein turning the switching transistor on transfers the electrons that overflowed from the photodiode into the floating diffusion region to the storage capacitor, and turning the switching transistor off stores the transferred electrons in the storage capacitor.

4. The image sensor according to claim 3, wherein when the transfer transistor is turned on, and electrons flow into the floating diffusion region from the photodiode, the switching transistor is turned on to output the stored electrons from the storage capacitor to the floating diffusion region, combining the stored electrons with the electrons flowing into the floating diffusion region from the photodiode to control the drive transistor.

5. An image sensor comprising:
   a photodiode;
   a transfer transistor for transferring charges from the photodiode to a floating diffusion region;
   a reset transistor connected between the floating diffusion region and a VDD voltage;
   a select transistor for selecting a unit pixel;
   a drive transistor connected between the VDD voltage and the select transistor, wherein a gate of the drive transistor is connected to the floating diffusion region;
   a storage capacitor between a side of the switching transistor and a ground; and
   switching transistor connected between the floating diffusion region and the storage capacitor,
   wherein the switching transistor is connected at a node between the photodiode and the reset transistor;
   wherein a drain of the switching transistor is disposed between the floating diffusion region and the reset transistor.

* * * * *